US009119222B2

(12) United States Patent  
Krishnaswamy et al.

(10) Patent No.: US 9,119,222 B2
(45) Date of Patent: Aug. 25, 2015

(54) RECONFIGURABLE MULTI-CHIP PROCESSING PLATFORM FOR CONCURRENT AGGREGATION OF WIRELESS TECHNOLOGIES

(75) Inventors: Dilip Krishnaswamy, San Diego, CA (US); Irfan H. Khan, San Diego, CA (US); Samir S. Soliman, San Diego, CA (US); Mohit K. Prasad, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 620 days.

(21) Appl. No.: 13/224,057

(22) Filed: Sep. 1, 2011

(65) Prior Publication Data

US 2013/0058216 A1    Mar. 7, 2013

(51) Int. Cl.  
*H04W 88/06* (2009.01)
(52) U.S. Cl.  
CPC ............... *H04W 88/06* (2013.01); *Y02B 60/50* (2013.01)
(58) Field of Classification Search  
CPC ... H04B 1/3816; H04W 88/06; G06K 19/072; Y02B 60/50  
USPC ......... 370/228, 241, 255, 310, 311, 338, 352; 455/466  
See application file for complete search history.

(56) References Cited

U.S. PATENT DOCUMENTS

| | | | |
|---|---|---|---|
| 2002/0154632 A1 | 10/2002 | Wang et al. | |
| 2006/0234693 A1* | 10/2006 | Isidore et al. | 455/422.1 |
| 2010/0099381 A1 | 4/2010 | Nakama | |
| 2010/0255843 A1* | 10/2010 | Huang et al. | 455/436 |
| 2010/0304782 A1 | 12/2010 | Chang et al. | |

(Continued)

FOREIGN PATENT DOCUMENTS

| | | |
|---|---|---|
| CN | 101350971 A | 1/2009 |
| EP | 1192725 | 12/2009 |

(Continued)

OTHER PUBLICATIONS

International Search Report and Written Opinion—PCT/US2012/053419—ISA/EPO—Dec. 18, 2012.

(Continued)

*Primary Examiner* — Pao Sinkantarakorn  
*Assistant Examiner* — Richard Chang  
(74) *Attorney, Agent, or Firm* — Jeffrey D. Jacobs

(57) ABSTRACT

Methods, systems, and devices are described for providing a reconfigurable multi-chip WWAN processing platform on a communications device. The processing platform allows the device to access multiple WWANs and multiple WWAN technologies concurrently. A first multiplexer is communicatively coupled with a number of baseband processing chips. A first baseband processing chip is selectively coupled with a first transceiver and a first UICC module to establish a first connection. A second baseband processing chip is selectively coupled with a second transceiver and a second UICC module to establish a second connection operable concurrently with the first connection. A multiplexer controller performs a configurable search for available networks. One or more networks are selected. The controller selects a specific transceiver for each selected network based on the capabilities of the transceiver. Baseband processing chips that consume less power serve as proxies for other baseband processing chips that consume more power.

38 Claims, 14 Drawing Sheets

(56) References Cited

U.S. PATENT DOCUMENTS

2011/0116490 A1    5/2011  Wilhelmsson et al.
2012/0106533 A1*   5/2012  Chen et al. .................... 370/342
2012/0115493 A1*   5/2012  Matada et al. ................ 455/450
2013/0203461 A1*   8/2013  Li ............................. 455/552.1

FOREIGN PATENT DOCUMENTS

| | | |
|---|---|---|
| EP | 2182640 | 5/2010 |
| JP | H11331069 A | 11/1999 |
| JP | 2001230704 A | 8/2001 |
| JP | 2009038790 A | 2/2009 |
| JP | 2009521896 A | 6/2009 |
| WO | 2007098218 A2 | 8/2007 |
| WO | 2010/140781 | 12/2010 |

OTHER PUBLICATIONS

Welte H "Anatomy of contemporary GSM cell phone hardware", Aug. 8, 2010, pp. 1-15, XP002688626, Retrieved from the Internet: URL:http://svn.gnumonks.org/trunk/presentation/2010/gsm_phone-anatomy/gsm_phone anatomyvO.4.pdf[retrieved on Dec. 4, 2012].

* cited by examiner

RECONFIGURABLE MULTI-CHIP PROCESSING PLATFORM FOR CONCURRENT AGGREGATION OF WIRELESS TECHNOLOGIES

BACKGROUND

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, and 3GPP Long Term Evolution (LTE).

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations.

Wireless networks enable the wireless terminals to establish wireless connections with the base stations over remote private or public networks using radio, satellite, and mobile phone technologies. An example of a wireless network includes a wireless wide area network (WWAN). A WWAN uses mobile telecommunication cellular network technologies provided by the multiple-access systems described above to send and receive data. Wireless terminals with WWAN connectivity can support multiple WWAN data technologies, but the wireless terminals often are able to support only one WWAN technology at any given time.

SUMMARY

Systems, methods, devices, and computer program products are described for providing a reconfigurable multi-chip WWAN processing platform with concurrent aggregation of multiple WWAN data technologies. In some examples, a mobile device includes at least one multiplexer, a number of baseband processing chips, a number of transceivers, and a number of Universal Integrated Circuit Card (UICC) modules. A multiplexer may be communicatively coupled with the number of baseband processing chips. A multiplexer may selectively couple a first baseband processing chip with a first UICC module to establish a first connection. Further, a multiplexer may selectively couple a second baseband chip with a second UICC module to establish a second connection that is operable concurrently with the first connection. In addition, a multiplexer may couple the first baseband processing chip with a first transceiver to allow communications with a first WWAN and the second baseband processing chip may be coupled with a second transceiver to provide concurrent communications with a second WWAN.

In one configuration, the first connection may include the first baseband processing chip coupled with the first UICC module and the first baseband processing chip coupled with the first transceiver. The second connection may include the second baseband processing chip coupled with the second UICC module and the second baseband processing chip coupled with the second transceiver.

In one example, the first multiplexer may decouple the second baseband processing chip from the second UICC module and couple the first baseband processing chip to the second UICC module. This may be done based on reduced consumption of power by the first baseband processing chip compared to the consumption of power by the second baseband processing chip. As a result the first baseband processing chip may function as a proxy for the second baseband processing chip. For example, the first baseband processing chip may execute operations on behalf of the second baseband processing chip. The second baseband processing chip may enter a sleep mode while the first baseband processing chip functions as a proxy.

In one configuration, as part of the proxying for the second baseband processing chip, the first baseband processing chip may execute email operations on behalf of the second baseband processing chip. In another configuration, the first baseband processing chip may execute instant messaging (IM) operations on behalf of the second baseband processing chip. During the proxy operations, the first baseband processing chip may monitor for the receipt of an active request directed to the second baseband processing chip. Upon receipt of an active request, the second baseband processing chip may enter an active mode. When the second baseband processing chip enters the active mode, the first baseband processing chip may cease to function as a proxy. For example, the first baseband processing chip may cease to execute operations on behalf of the second baseband processing chip.

In one example, the first multiplexer may be integrated into one of the plurality of baseband processing chips. At least one of the plurality of baseband processing chips may manage one or more applications executing on the communications device. For example, at least one of the plurality of baseband processing chips may manage a display of the communications device.

In one configuration, the communications device may further include a second multiplexer. The second multiplexer may be communicatively coupled with the plurality of baseband processing chips. In one example, the second multiplexer may selectively couple the first baseband processing chip with a first transceiver to establish a third connection, and selectively couple the second baseband processing chip with a second transceiver to establish a fourth connection. The fourth connection may be operable concurrently with the third connection.

The communications device may also include a multiplexer controller. The controller may search for available networks and select one or more networks based on the search. In addition, the controller may select an operational frequency band for each of the one or more networks, and select one of the plurality of transceivers for each of the one or more networks.

A method for establishing a reconfigurable multi-chip WWAN processing platform is also described. In one configuration, a first multiplexer may be communicatively coupled with a plurality of baseband processing chips. A first baseband processing chip may be selectively coupled with a first Universal Integrated Circuit Card (UICC) chip to establish a first connection. A second baseband processing chip with may be selectively coupled with a second UICC module to establish a second connection. The second connection may be operable concurrently with the first connection. In addition the first baseband processing chip may be selectively coupled with a first transceiver to provide communications with a first network. Further, the second baseband processing chip may be selectively coupled with a second transceiver to provide communications with a second network. The communications with the first network and the second network may be accessible in parallel via the first and second transceivers.

A system for establishing a reconfigurable multi-chip WWAN processing platform is also described. The system may include means for communicatively coupling a first multiplexer with a plurality of baseband processing chips. The system may further include means for selectively coupling a first baseband processing chip with a first Universal Integrated Circuit Card (UICC) module to establish a first connection. In addition, the system may include means for selectively coupling a second baseband processing chip with a second UICC module to establish a second connection operable concurrently with the first connection. Further, the system may include means for selectively coupling the first baseband processing chip with a first transceiver to provide access to a first network. The system may also provide means for selectively coupling the second baseband processing chip with a second transceiver to establish communications with a second network, concurrently with the access to the first network.

FIG. 13 is a flow chart illustrating one example of a method to select a specific transceiver to communicate across a selected network.

The foregoing has outlined rather broadly the features and technical aspects of examples according to disclosure. Additional features will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, will be better understood from the following description when considered in connection with the accompanying figures. Each of the figures is provided for the purpose of illustration and description only and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
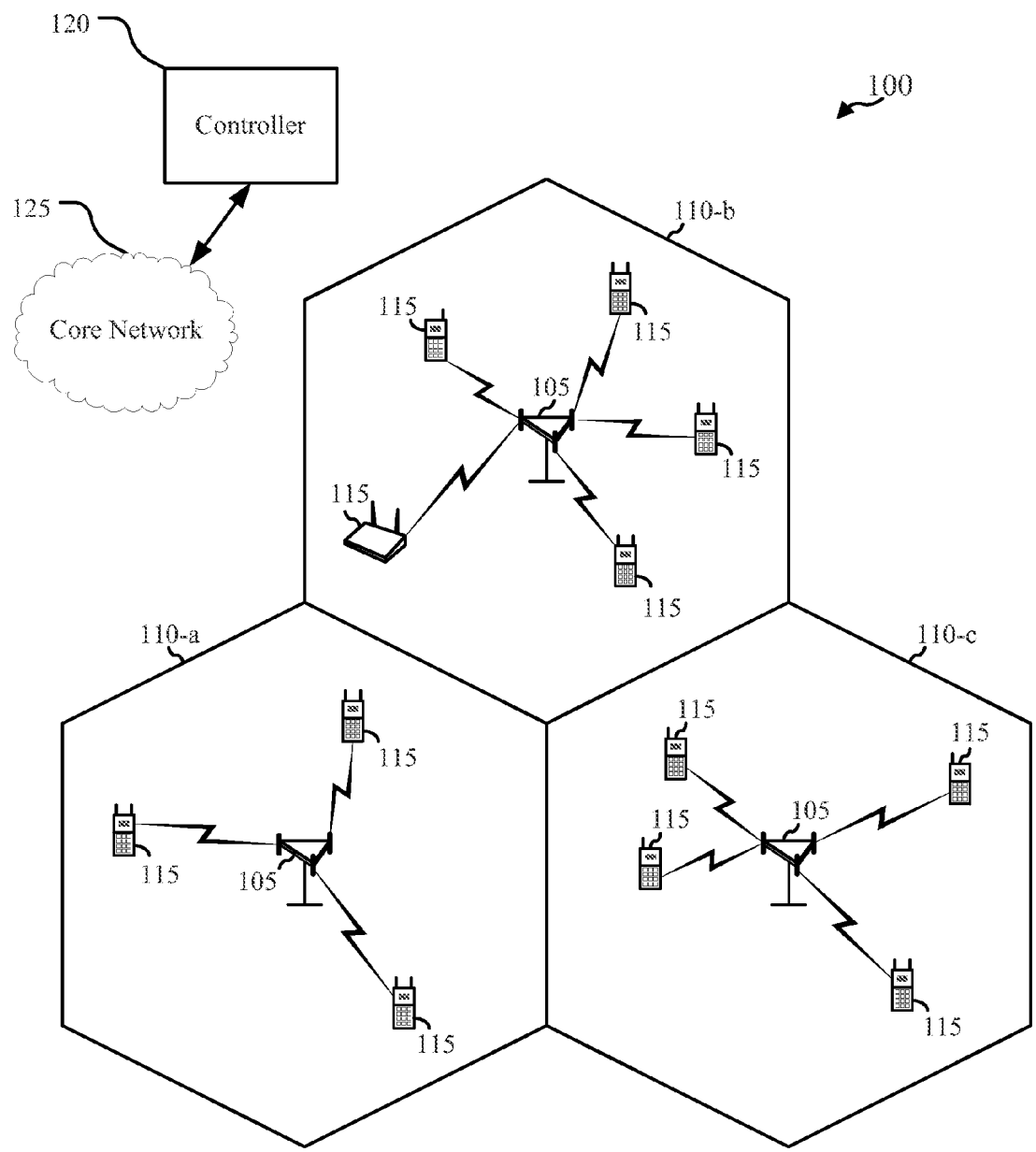
FIG. 1 shows a block diagram of a wireless communications system.

Systems, methods, and computer program products are described to provide a reconfigurable multi-chip WWAN processing platform on a communications device. The processing platform may allow the communications device to access multiple WWAN data technologies concurrently. The platform may include at least one multiplexer, a number of baseband processing chips, a number of UICC modules, and a number of transceivers. Each UICC module and transceiver may provide access for the device to a different WWAN data technology. To provide different WWAN data technologies to the communications device concurrently, a multiplexer may dynamically connect a first baseband processing chip with a first UICC module and/or a first transceiver to establish a first connection. The first connection may provide the device access to a first WWAN data technology. A multiplexer may also dynamically connect a second baseband processing chip with a second UICC module and/or a second transceiver to establish a second connection. The second connection may provide the device access to a second WWAN data technology. As a result, the device may use different WWAN data technologies simultaneously.

Further, when the device enters a low power state, a multiplexer may connect a UICC module and/or a transceiver to a baseband processing chip that consumes a lesser amount of power as compared with the other baseband processing chips. The connected baseband processing chip may serve as a proxy for a baseband processing chip that is not connected to the UICC module and/or the transceiver. The connected baseband processing chip may continue to serve as a proxy until a request is received to activate the unconnected baseband processing chip. The at least one multiplexer may then connect the activated baseband processing chip with the UICC module and/or the transceiver.

Techniques described herein may be used for various wireless communications systems such as Code Division Multiple Access (CDMA), Time Division Multiple Access (TDMA), Frequency Division Multiple Access (FDMA), Orthogonal FDMA (OFDMA), Single-Carrier FDMA (SC-FDMA), and other systems. The terms "system" and "network" are often used interchangeably. A CDMA system may implement a technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a technology such as Global System for Mobile Communications (GSM). An OFDMA system may implement a technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2).

The techniques described herein may be used for the systems and technologies mentioned above as well as other systems and technologies. A mobile device in a wireless system may include a multi-chip platform described that allows the device to simultaneously access the various technologies implemented by the system.

The following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring first to FIG. 1, a block diagram illustrates an example of a wireless communications system 100. The system 100 includes base stations 105, mobile devices 115, a base station controller 120, and a core network 125 (the controller 120 may be integrated into the core network 125). The system 100 may support operation on multiple carriers (waveform signals of different frequencies).

The base stations 105 may wirelessly communicate with the mobile devices 115 via a base station antenna (not shown). The base stations 105 are configured to communicate with the mobile devices 115 under the control of the controller 120 via multiple carriers. Each of the base station 105 sites can provide communication coverage for a respective geographic area. The coverage area for each base station 105 here is identified as 110-a, 110-b, or 110-c. The coverage area for a base station may be divided into sectors (not shown, but making up only a portion of the coverage area). The system 100 may include base stations 105 of different types (e.g., macro, micro, and/or pico base stations). There may be overlapping coverage areas for different technologies.

The mobile devices 115 may be dispersed throughout the coverage areas 110. The mobile devices 115 may be referred to as mobile stations, mobile devices, access terminals (ATs), user equipments (UEs), subscriber stations (SSs), or subscriber units. The mobile devices 115 may include cellular phones and wireless communications devices, but may also include personal digital assistants (PDAs), other handheld devices, netbooks, notebook computers, etc.

The base stations 105 may provide different data technologies. For example, one base station may provide High Speed Packet Access (HSPA) technologies while another (or the same) base station may also provide Long Term Evolution (LTE) technologies. The mobile devices 115 may include an architecture that allows them to support the different technologies. For example, a single mobile device 115 may include the architecture that allows the mobile device to support HSPA and LTE simultaneously. In one configuration, the architecture installed on each mobile device 115 may include at least one multiplexer, a number of baseband processing chips, a number of UICC modules, and a number of transceivers. Each UICC module and transceiver may support a different WWAN data technology provided by the different base stations 105. A multiplexer may selectively connect a first baseband processing chip with a first UICC module and/or a first transceiver to establish a first connection. The first connection may allow the respective mobile device to support a first WWAN data technology provided by a base station. A multiplexer may also selectively connect a second baseband processing chip with a second UICC module and/or a second transceiver to establish a second connection. The second connection may provide the respective device the ability to support a second WWAN data technology provided by a different base station. In addition, the architecture may allow the mobile device to search for available networks, select a network, and select a specific transceiver of the mobile device to establish communications with the selected network. The selected transceiver may be specifically designed to communicate with the selected network.

Figure 2:
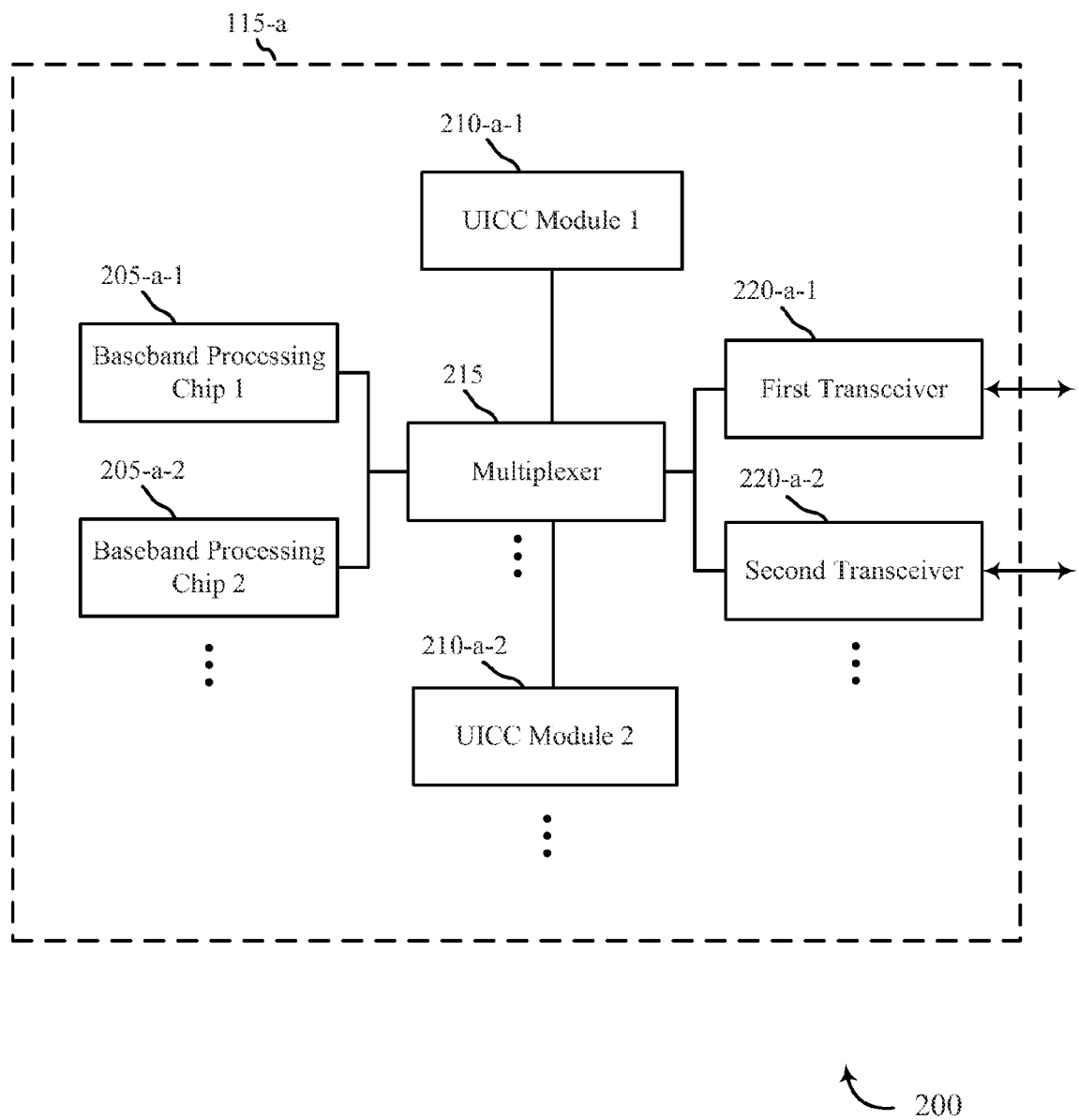
FIG. 2 shows a block diagram of a mobile device.

FIG. 2 is a block diagram 200 illustrating one configuration of a mobile device 115-a. This may be an example of the mobile device 115 of FIG. 1. The device may include a number of baseband processing chips 205-a, a number of UICC modules 210-a, a number of transceivers 220-a, and a multiplexer 215. A UICC module may be a UICC card, a Subscriber Identity Module (SIM) card, or a software implementation of SIM/UICC capabilities referred to as a Virtual SIM (VSIM). The UICC module may include a Universal SIM (USIM)/CDMA SIM (CSIM) application to manage subscriber/authentication information and storage in 3G UMTS/LTE/CDMA networks. A SIM card may include a SIM software application to manage/authentication information and storage in GSM/GPRS/EDGE networks. In one example, the number of baseband processing chips 205-a and the number of UICC modules 210-a may be connected to the multiplexer 215. In addition, the number of transceivers 220-a may also be connected to the multiplexer 215.

In one example, the multiplexer 215 may be made available on a separate chip in the mobile device 115-a. In another example, the multiplexer 215 may be integrated within one of the existing baseband processing chips 205-a. The multiplexer 215 may enable the mobile device 115-a to simultaneously support different data technologies and connect to different networks via the number of transceivers. In one configuration, the multiplexer 215 may selectively connect a first baseband processing chip 205-a-1 with a first UICC module 210-a-1 to establish a first connection that supports a first data technology. The multiplexer 215 may also selectively connect the first baseband processing chip 205-a-1 with a first transceiver 220-a-1 to establish communications with a first network. In addition, the multiplexer may selectively connect a second baseband processing chip 205-a-2 with a second UICC 210-a-2 to establish a second connection. The second connection may allow the mobile device 115-a to support a second data technology while concurrently supporting the first data technology. The multiplexer 215 may also selectively connect the second baseband processing chip 205-a-2 with a second transceiver 220-a-2 to establish communications with a second network. As a result, the architecture of the mobile device 115-a described above may allow the mobile device 115-a to simultaneously support different WWAN technologies and communicate concurrently over multiple networks via the number of transceivers.

Figure 3:
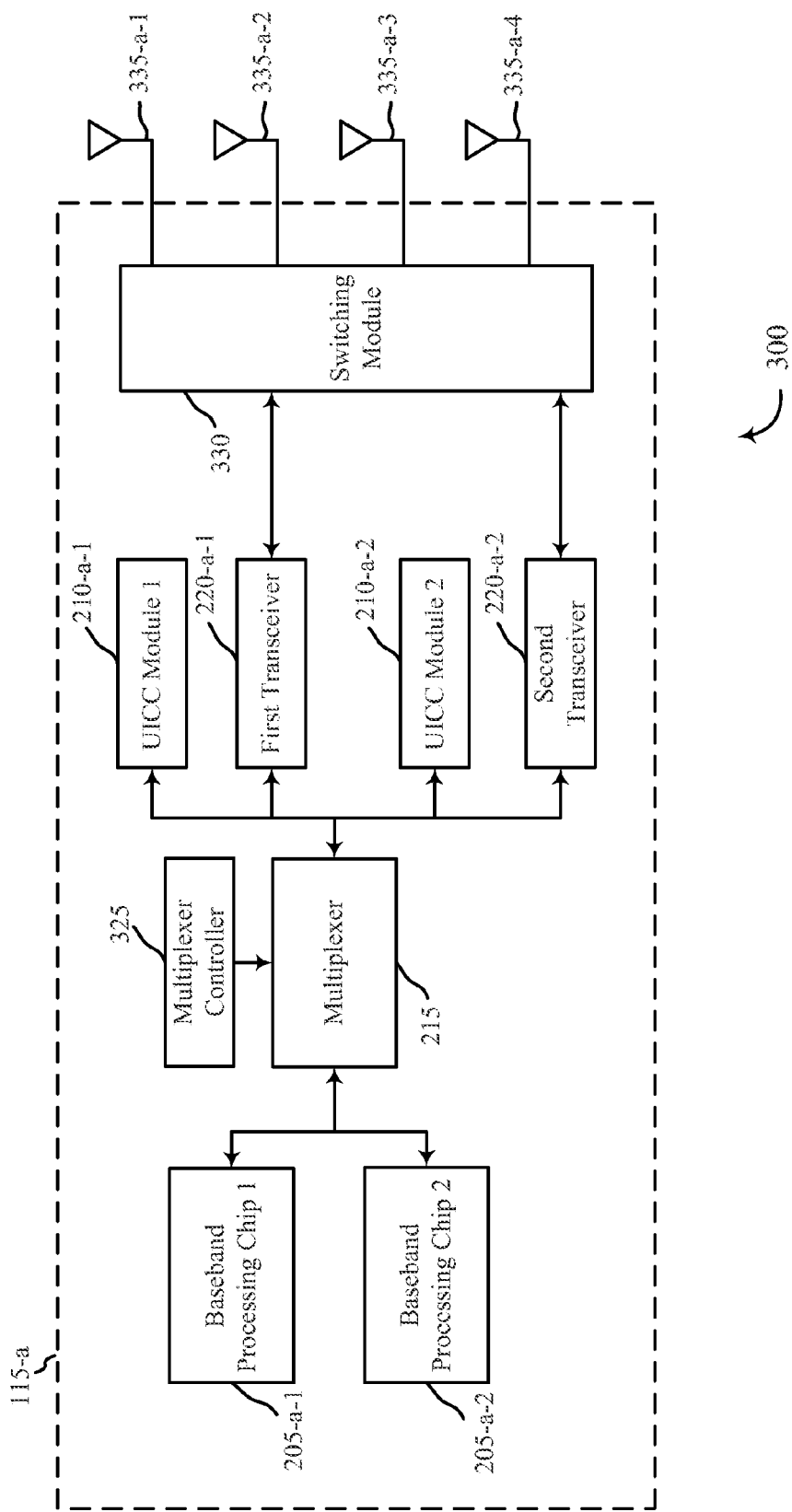
FIG. 3 shows a block diagram of a further example of the mobile device.

FIG. 3 is a block diagram 300 illustrating one example of a mobile device 115-*a*. This may be an example of the mobile device 115-*a* of FIG. 2, which may be an example of the mobile device 115 of FIG. 1. The mobile device 115-*a* may include a number of baseband processing chips 205-*a*, a number of UICC modules 210-*a*, a number of transceivers 220-*a*, and a multiplexer 215. In addition, the mobile device 115-*a* may further include a multiplexer controller 325, a switching module 330, and a number of antennas 335-*a*.

Each baseband processing chip 205-*a* may connect to either UICC module (UICC module 1 210-*a*-1 or UICC module 2 210-*a*-2) and either transceiver (the first transceiver 220-*a*-1 or the second transceiver 220-*a*-2) via the multiplexer 215 in order to use the wireless technologies provided by the selected UICC module and connect to the wireless network via the selected transceiver. The multiplexer controller 325 may control the multiplexer 215 to manage the dynamic connections between the baseband processing chips 205-*a*, the UICC modules 210-*a*, and the transceivers 220-*a*.

The multiplexer 215 may allow for the mobile device 115-*a* to enter a concurrent aggregation mode. In the concurrent aggregation mode, baseband processing chip 1 205-*a*-1 may connect with a transceiver (such as the first transceiver 220-*a*-1 or the second transceiver 220-*a*-2) and a UICC module (such as UICC module 1 210-*a*-1 or UICC module 2 210-*a*-2) to access a network and data technology provided by the network. While baseband processing chip 1 205-*a*-1 is connected, baseband processing chip 2 205-*a*-2 may simultaneously connect with the transceiver and UICC that are not connected with baseband processing chip 1 205-*a*-1. For example, baseband processing chip 1 205-*a*-1 may connect (via the multiplexer 215) to UICC module 1 210-*a*-1 and the first transceiver 220-*a*-1 to access a first WWAN and a first WWAN technology while baseband processing chip 2 205-*a*-2 may simultaneously connect (also via the multiplexer 215) to UICC module 2 210-*a*-2 and the second transceiver 220-*a*-1 to access a second WWAN and a second WWAN technology.

The multiplexer 215 may also dynamically alter existing connections. For example, the multiplexer 215 may change the connection between baseband processing chip 1 205-*a*-1, UICC module 1 210-*a*-1, and the first transceiver 220-*a*-1 to a connection between baseband processing chip 1 205-*a*-1, UICC module 2 210-*a*-2, and the second transceiver 220-*a*-2. Similarly, the multiplexer 215 may change the connection between baseband processing chip 2 205-*a*-2, UICC module 2 210-*a*-2, and the second transceiver 220-*a*-2 to a connection between baseband processing chip 2 205-*a*-2, UICC module 1 210-*a*-1, and the first transceiver 220-*a*-1. In other words, the multiplexer 215 may facilitate various types of connections between the baseband processing chips 205-*a*, the UICC modules 210-*a*, and the transceivers 220-*a* in the mobile device 115-*a*.

Figure 3A:
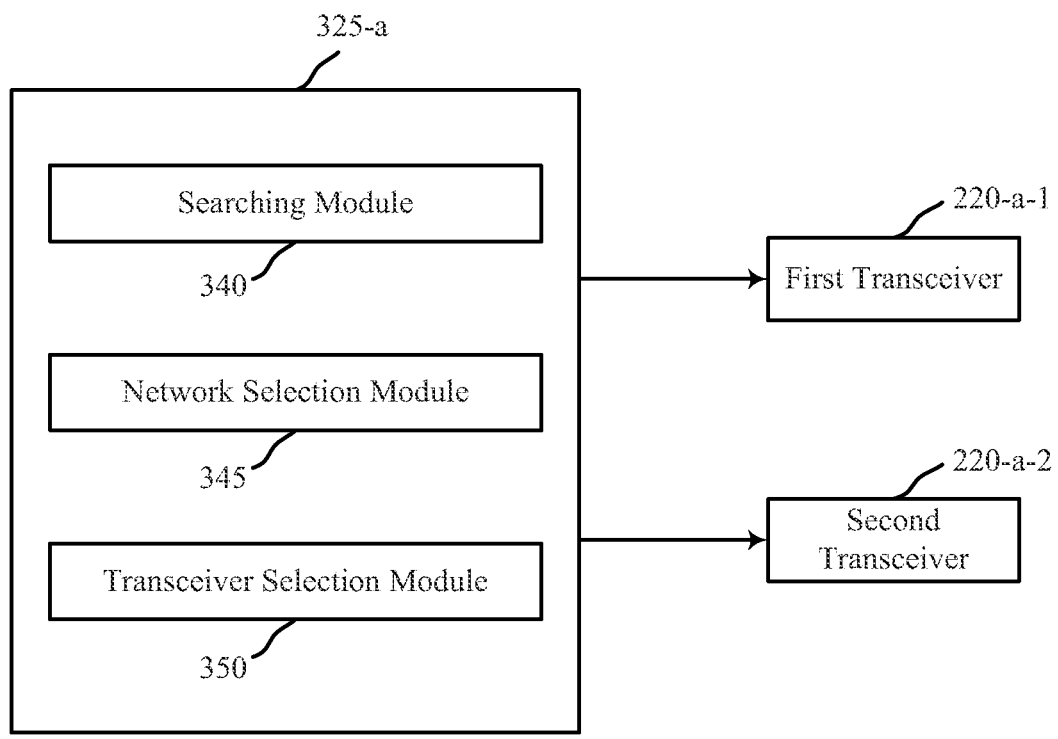
FIG. 3A illustrates one example of a multiplexer controller.

In one configuration, the multiplexer controller 325 may also search for available networks before the device 115-*a* has established communications with a network or while the device is communicating across a current network connection. For example, FIG. 3A illustrates one example of a multiplexer controller 325-*a*. The controller 325-*a* may be an example of the multiplexer controller 325 of FIG. 3. In one example, the controller 325-*a* may have access to the transceivers 220 on the device 115-*a*. The controller 325-*a* may include a searching module 340, a network selection module 345, and a transceiver selection module 350. In one configuration, the searching module 340 may search for available networks. The network selection module 345 may select a number of networks discovered during the search for available networks. In one configuration, the transceiver selection module 350 may select one of the number of transceivers on the device 115-*a* for each selected network. For example, the network selection module 345 may select an operational frequency band for a selected network. The first transceiver 220-*a*-1 may be specifically designed (or better tuned) to operate on the selected operational frequency band than the second transceiver 220-*a*-2. For example, the first transceiver 220-*a*-1 may provide improved interference cancellation at this operational frequency band than the second transceiver 220-*a*-2. As a result, the transceiver selection module 350 may select the first transceiver 220-*a*-1 to carry-out communications with the selected network. In one configuration, the functions of the multiplexer controller 325-*a* may be implemented in software, hardware, or a combination thereof.

Referring again to FIG. 3, signals may be transmitted and received via the number of antennas 335-*a*. The device 115-*a* may employ multiple-input and multiple-output (MIMO) technology by using multiple antennas to improve communication performance. In one configuration, one or more of the number of antennas 335-*a* may be active to transmit and receive information. The switching module 330 may regulate the activation/deactivation of each of the antennas 335-*a* depending on the desired communication performance of the mobile device 115-*a*.

In one configuration, the mobile device 115-*a* may enter a low data rate mode of operation. If the device 115-*a* enters the low data rate mode of operation, it may be desirable for the device 115-*a* to use a single baseband processing chip 205-*a*, a single transceiver 220-*a*, and a single UICC module 210-*a* to achieve a low data rate. While in the low data rate mode of operation, the device 115-*a* may also be in a state where low power is desired. If this occurs, the single baseband processing chip 205-*a* that consumes the least amount of power should be used. Each baseband processing chip 205-*a* in the mobile device 115-*a* may have different characterizations in terms of leakage power and active power. For example, baseband processing chip 2 205-*a*-2 may consume lower power (i.e., lower leakage and/or active power) compared to baseband processing chip 1 205-*a*-1.

As explained above, if the device 115-*a* enters a state where low power and low data rate are desired, it is desirable for the device 115-*a* to activate a single baseband processing chip 205-*a* that consumes the least amount of power (as compared with the other baseband processing chips). In one example, when the device 115-*a* enters the low power and low data rate state, a baseband processing chip (such as baseband processing chip 1 205-*a*-1) that consumes a higher amount of power may be currently active. As a result, the multiplexer 215 may disconnect this chip and connect the baseband processing chip (such as baseband processing chip 2 205-*a*-2) that consumes a lower amount of power to the UICC module and the transceiver. In one configuration, the lower power baseband processing chip may proxy for the higher power baseband processing chip. In other words, the multiplexer 215 may decouple baseband processing chip 1 205-*a*-1 from a UICC module and a transceiver and couple baseband processing chip 2 205-*a*-2 to the UICC module and the transceiver based on a reduced consumption of power by baseband processing chip 2 205-*a*-2 compared to the consumption of power by baseband processing chip 1 205-*a*-1. In one example, baseband processing chip 1 205-*a*-1 may enter a sleep mode while baseband processing chip 2 205-*a*-2 serves as a proxy for baseband processing chip 1 205-*a*-1 by executing operations on behalf of baseband processing chip 1 205-*a*-1. Baseband processing chip 1 205-*a*-1 may remain in the sleep mode until a particular event occurs and baseband processing chip 1

205-*a*-1 may exit from the sleep mode and return to an active mode to execute the particular event.

As an example, baseband processing chip 1 205-*a*-1 may be a processing chip that consumes a higher rate of power by executing applications, operating a display of the device 115-*a*, etc. Baseband processing chip 2 205-*a*-2 may not execute or operate such functions and as a result, consumes lower power than baseband processing chip 1 205-*a*-1. As described previously, if the mobile device 115-*a* enters a lower data rate mode of operation, only one UICC module and one transceiver may be in use. For example, baseband processing chip 1 205-*a*-1 may be using UICC module 1 210-*a*-1 and the first transceiver 220-*a*-1 while UICC module 2 210-*a*-2 and the second transceiver 220-*a*-2 are not in use. When the mobile device 115-*a* enters a state where lower power consumption is also desired, baseband processing chip 1 205-*a*-1 may still be utilizing UICC module 1 210-*a*-1 and the first transceiver 220-*a*-1. Because lower power consumption is desired, the multiplexer 215 may dynamically switch the connection of UICC module 1 210-*a*-1 and the first transceiver 220-*a*-1 from baseband processing chip 1 205-*a*-1 to baseband processing chip 2 205-*a*-2. As a result, the multiplexer 215 may allow the mobile device 115-*a* to remain in a lower data rate mode of operation (i.e., using only one UICC and one transceiver) while consuming less power by allowing baseband processing chip 2 205-*a*-2 to proxy for baseband processing chip 1 205-*a*-1.

Proxy operations carried out by baseband processing chip 2 205-*a*-2 during a proxy of baseband processing chip 1 205-*a*-1 may include, but are not limited to, application proxies such as proxying email or instant messaging (IM) applications. In one configuration, baseband processing chip 2 205-*a*-2 may receive messages over a WWAN that relate to network keep-alive messages, IM presence updates, etc. When a significant message arrives over the WWAN, such as an email, an active request to chat, or a delivered twittered message, baseband processing chip 1 205-*a*-1 may exit the sleep mode and enter an active mode to receive the message. In one configuration, the action of baseband processing chip 1 205-*a*-1 entering the active mode may be delayed to save power if the arriving significant message is determined to be a delay tolerant message.

Figure 4:
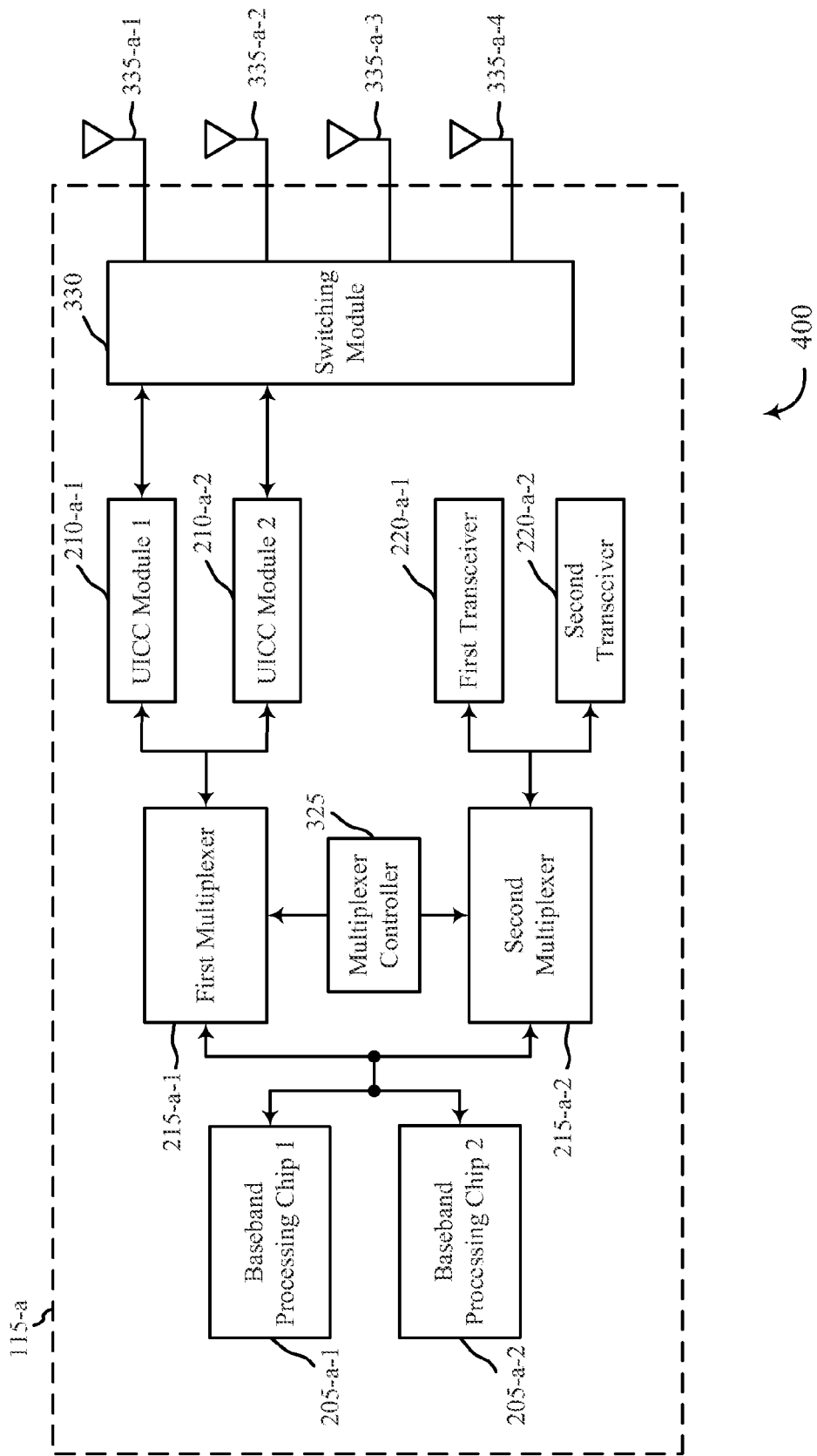
FIG. 4 shows a block diagram of an example of a multi-chip processing platform that may be implemented in the mobile device.

Referring now to FIG. 4, a block diagram 400 illustrates one example of a mobile device 115-*a*. This may be an example of the mobile device 115-*a* of FIG. 2, which may be an example of the mobile device 115 of FIG. 1. The mobile device 115-*a* may include a reconfigurable multi-chip WWAN processing platform that allows the device 115-*a* to access different WWANs and different WWAN data technologies concurrently. In one configuration the processing platform of the device 115-*a* may include a number of baseband processing chips 205-*a*, a number of UICC modules 210-*a*, and a first multiplexer 215-*a*-1. The first multiplexer 215-*a*-1 may selectively couple a first baseband processing chip (such as baseband processing chip 1 205-*a*-1) with a first UICC module 210-*a*-1 to establish a first connection. The first multiplexer 215 may also selectively couple a second baseband processing chip (such as baseband processing chip 2 205-*a*-2) with a second UICC module 210-*a*-2 to establish a second connection. The first connection may provide the mobile device 115-*a* access to a first WWAN data technology while the second connection may provide the mobile device 115-*a* access to a second WWAN data technology. In one configuration, the second connection may be operable concurrently with the first connection.

The platform of the device 115-*a* may further include a number of transceivers 220-*a* and a second multiplexer 215-*a*-2. The second multiplexer 215-*a*-2 may also be communicatively coupled with the number of baseband processing chips 205-*a*. In one configuration, the second multiplexer 215-*a*-2 may selectively couple the first baseband processing chip (such as baseband processing chip 1 205-*a*-1) with a first transceiver 220-*a*-1 to establish a third connection. The second multiplexer 215-*a*-2 may also selectively couple the second baseband processing chip (such as baseband processing chip 2 205-*a*-2) with a second transceiver 220-*a*-2 to establish a fourth connection. The first connection, the second connection, the third connection, and the fourth connection may be concurrently operable. In one configuration, the third connection may provide the mobile device 115-*a* access to a particular WWAN and the fourth connection may provide the device 115-*a* access to a WWAN that may be different than the WWAN provided by the third connection. Thus, the mobile device 115-*a* may include an architecture with any number of multiplexers to allow the mobile device 115-*a* to establish connections between various baseband processing chips and other components within the device 115-*a*, such as UICC modules and transceivers. These connections may be reconfigurable and dynamic so that each baseband processor within the mobile device 115-*a* may be connected to any UICC module, transceiver, or combination thereof via the number of multiplexers 215-*a* in the architecture. The mobile device 115-*a* may include any number of multiplexers to increase the possible combinations of connections between the baseband processing chips and the other components within the mobile device 115-*a*. Each of these various combinations may provide the mobile device 115-*a* with access to a particular WWAN and a particular WWAN data technology. The use of the multiplexers 215-*a* allow the various connections to occur concurrently which may allow the mobile device 115-*a* to access multiple WWANs and multiple WWAN data technologies simultaneously.

In one configuration, the mobile device 115-*a* may enter a low data rate mode of operation and a low power state. The first multiplexer 215-*a*-1 or the second multiplexer 215-*a*-2 may disconnect the baseband processing chips that consume a higher rate of power as compared to the other baseband processing chips in the mobile device 115-*a*. The multiplexers 215-*a* may connect the baseband processing chip (such as baseband processing chip 2 205-*a*-2) that consumes a lower amount of power to the UICC module and the transceiver that provides the mobile device 115-*a* with access to a desired WWAN technology. In one configuration, the lower power baseband processing chip may proxy for the higher power baseband processing chip. As an example, the first multiplexers 215-*a*-1 may decouple baseband processing chip 1 205-*a*-1 from UICC module 1 210-*a*-1 and the second multiplexer 215-*a*-2 may decouple baseband processing chip 1 205-*a*-1 from a first transceiver 220-*a*-1. The first multiplexer 215-*a*-1 may proceed to couple baseband processing chip 2 205-*a*-2 to UICC module 1 210-*a*-1 and the second multiplexer 215-*a*-2 may couple baseband processing chip 2 205-*a*-2 to the first transceiver 220-*a*-1 based on a reduced consumption of power by baseband processing chip 2 205-*a*-2 compared to the consumption of power by baseband processing chip 1 205-*a*-1. In one example, baseband processing chip 1 205-*a*-1 may enter a sleep mode while baseband processing chip 2 205-*a*-2 serves as a proxy for baseband processing chip 1 205-*a*-1 by executing operations on behalf of baseband processing chip 1 205-*a*-1. Baseband processing chip 1 205-*a*-1 may remain in the sleep mode until a particular event occurs and baseband processing chip 1 205-*a*-1 may exit from the sleep mode and return to an active mode to execute the particular event.

In one configuration, the first multiplexer 215-*a*-1 and the second multiplexer 215-*a*-2 may not be collocated on the same chip within the mobile device 115-*a*. In another configuration, the multiplexers 215-*a* may be collocated on the same chip within the device 115-*a*. A multiplexer controller 325 may control the connections between the baseband processing chips 205-*a*, the number of transceivers 210-*a*, and the number of UICC modules 220-*a* based on the desired WWAN and desired WWAN data technology to be implemented. Thus, there may be other configurations of a number of multiplexers 215-*a* that may be implemented in the architecture of the mobile device 115-*a*.

Figure 5:
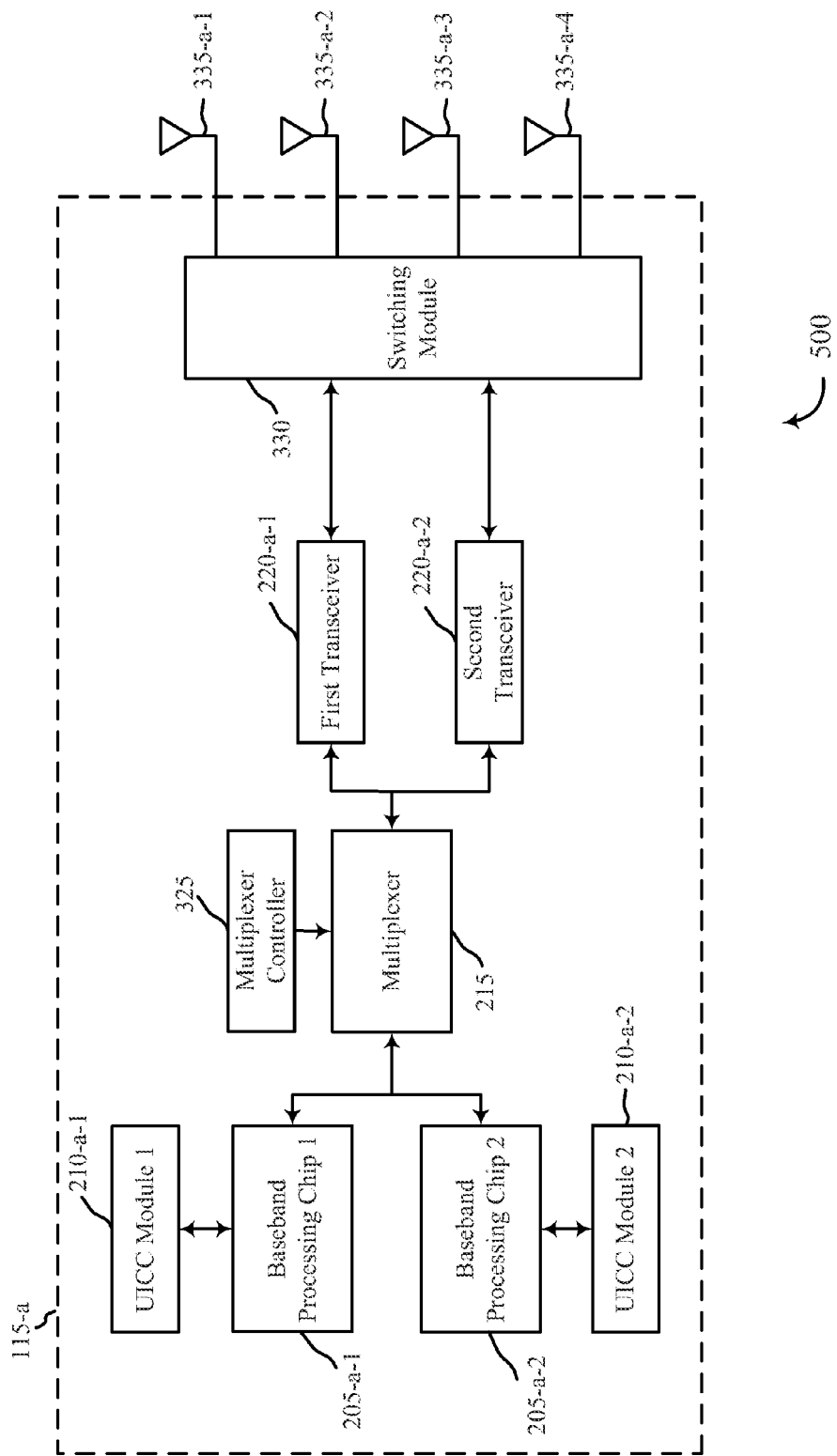
FIG. 5 shows a block diagram of a further example of the multi-chip processing platform.

FIG. 5 is a block diagram 500 illustrating another example of a mobile device 115-*a*. This may be an example of the mobile device 115 of FIG. 1 or 2. The mobile device 115-*a* may include a reconfigurable architecture to allow the mobile device 115-*a* to connect to different WWANs and use different WWAN technologies simultaneously. In one configuration, the architecture may include a number of baseband processing chips 205-*a*, a number of UICC modules 210-*a*, at least one multiplexer 215, and a number of transceivers 220-*a*. Each of the UICC modules 210-*a* and each of the transceivers 220-*a* may provide the mobile device 115-*a* access to a different WWAN and to a different WWAN technology. In one example, each baseband processing chip 205-*a* may be directly connected to a UICC module 210-*a*, without the use of the multiplexer 215. The multiplexer 215 (via the multiplexer controller 325) may dynamically connect a first baseband processing chip (such as baseband processing chip 1 205-*a*-1) to one of the transceivers (such as a first transceiver 220-*a*-1) to establish a first connection that establishes communications with a particular WWAN. Similarly, the multiplexer 215 may dynamically connect a second baseband processing chip (such as a second baseband processing chip 205-*a*-2) to a different transceiver (such as a second transceiver 220-*a*-2) to establish a second connection that may provide the mobile device 115-*a* simultaneous communications with a different WWAN. As a result, baseband processing chip 1 205-*a*-1 may be connected to UICC module 1 210-*a*-1 and also connected to either the first transceiver 220-*a*-1 or the second transceiver 220-*a*-2 through the multiplexer 215. Similarly, baseband processing chip 2 205-*a*-2 may be connected to UICC module 2 210-*a*-2 as well as either the first transceiver 220-*a*-1 or the second transceiver 220-*a*-2 via the multiplexer 215. Thus, there may be other configurations of connections between baseband processing chips, UICC modules, and transceivers in the architecture of the mobile device 115-*a*.

Figure 6:
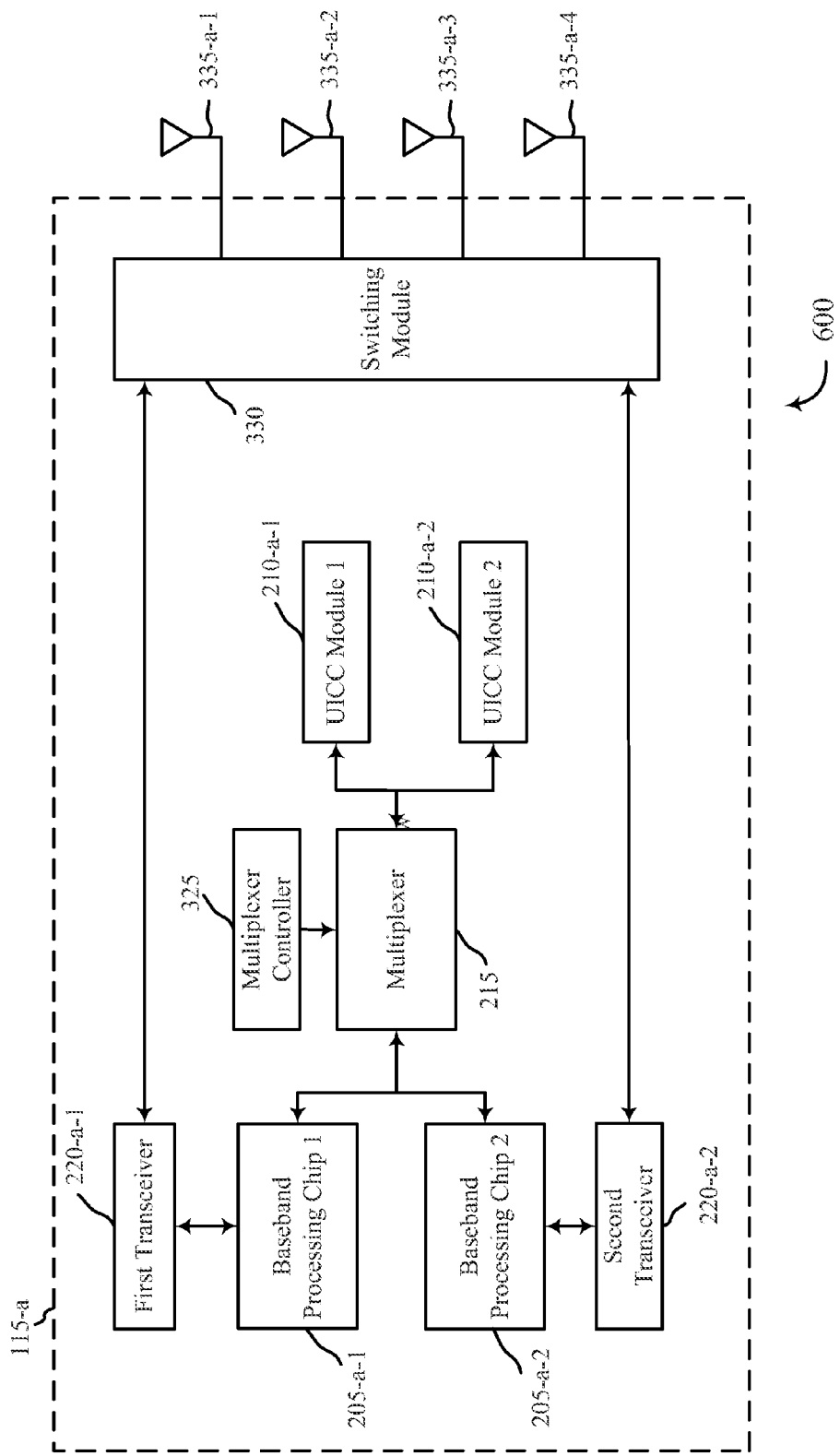
FIG. 6 shows a block diagram of another example of the multi-chip processing platform.

FIG. 6 is a block diagram 600 illustrating another example of a mobile device 115-*a*. This may be an example of the mobile device 115-*a* of FIG. 2, which may be an example of the mobile device 115 of FIG. 1. In one example, the mobile device 115-*a* may include a reconfigurable multi-chip processing platform to allow the mobile device 115-*a* to access different WWAN technologies simultaneously. In one configuration, the platform may include a number of baseband processing chips 205-*a*, a number of UICC modules 210-*a*, at least one multiplexer 215, and a number of transceivers 220-*a*. Each of the UICC modules 210-*a* and transceivers 220-*a* may allow the mobile device 115-*a* to access a different WWAN and different technologies associated with each WWAN. In one example, each baseband processing chip 205-*a* may be directly connected with a specific transceiver 220-*a*, without the use of the multiplexer 215. The multiplexer 215 (via the multiplexer controller 325) may selectively couple a first baseband processing chip (such as baseband processing chip 1 205-*a*-1) to one of the UICC modules (such as UICC module 1 210-*a*-1) to establish a first connection that provides access to a first WWAN data technology. Similarly, the multiplexer 215 may selectively couple a second baseband processing chip (such as a second baseband processing chip 205-*a*-2) to a different UICC module (such as UICC module 2 210-*a*-2) to establish a second connection that may provide the mobile device 115-*a* concurrent access to a second WWAN technology. As a result, baseband processing chip 1 205-*a*-1 may be connected to the first transceiver 220-*a*-1 and also connected to either UICC module 1 210-*a*-1 or UICC module 2 210-*a*-2 through the multiplexer 215. Similarly, baseband processing chip 2 205-*a*-2 may be connected to the second transceiver 220-*a*-2 as well as either UICC module 1 210-*a*-1 or UICC module 2 210-*a*-2 via the multiplexer 215. There may be other configurations of connections between baseband processing chips, UICC modules, and transceivers available with the multi-chip processing platform of the mobile device 115-*a*.

Figure 7:
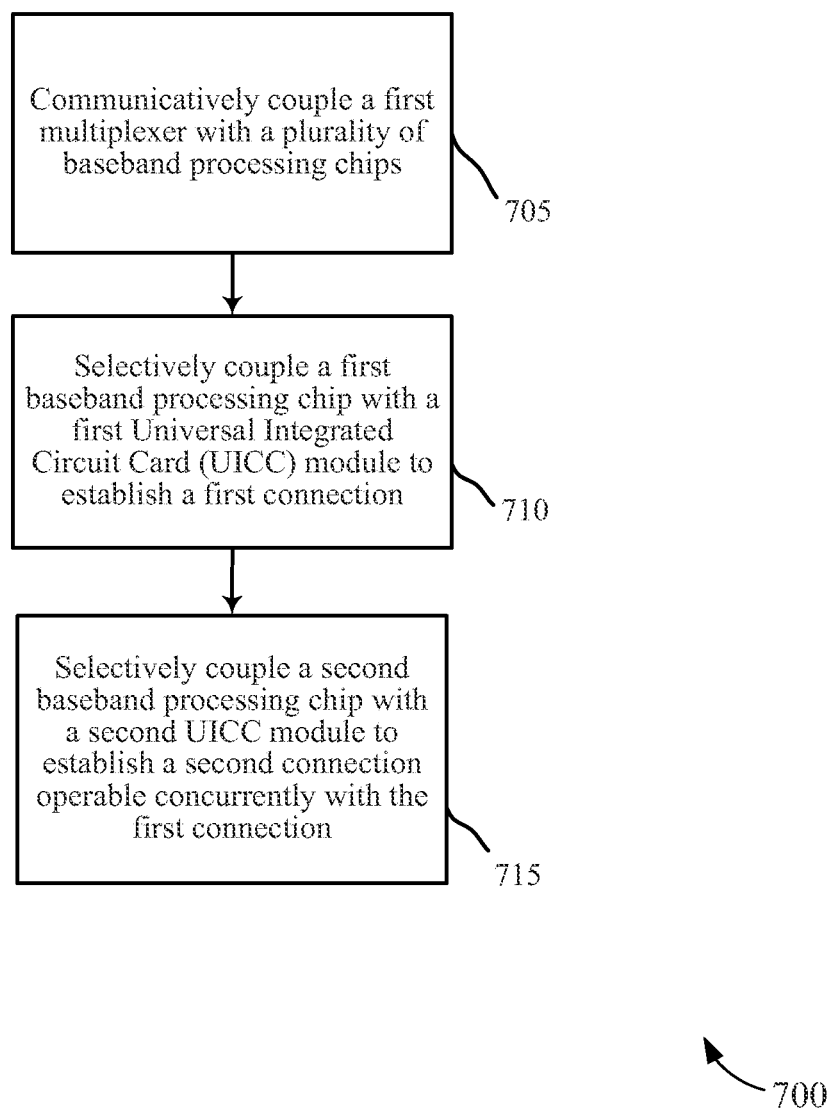
FIG. 7 is a flow chart of a method to concurrently access different Wireless Wide Area Network (WWAN) data technologies using the multi-chip processing platform.

FIG. 7 is a flow chart illustrating one example of a method 700 to concurrently access different WWAN data technologies. For clarity, the method 700 is described below with reference to the mobile device 115-*a* shown in FIG. 2, which may be an example of the mobile device 115 of FIG. 1, 3, 4, 5, or 6. The method 700 may be implemented by a first multiplexer 215-*a*-1, which may be an example of the multiplexer 215 of FIG. 2. At block 705, the first multiplexer 215-*a*-1 may be communicatively coupled with a number of baseband processing chips 205-*a*. For example, the first multiplexer 215-*a*-1 may be integrated into one of the number of baseband processing chips 205-*a*. As another example, the first multiplexer 215-*a*-1 may be located on a chip separate from the baseband processing chips 205-*a* and may be in electronic communication with each of the processing chips 205-*a*. At block 710, a first baseband processing chip, such as baseband processing chip 1 205-*a*-1, may be selectively coupled with a first UICC module, such as UICC module 1 210-*a*-1 to establish a first connection. In one configuration, the first connection may provide the mobile device 115-*a* access to a first WWAN data technology. At block 715, a second baseband processing chip, such as baseband processing chip 2 205-*a*-2, may be selectively coupled with a second UICC module, such as UICC module 2 210-*a*-2 to establish a second connection. In one example, the second connection may allow the mobile device 115-*a* to access a second WWAN data technology. In one configuration, the second connection may be operable concurrently with the first connection. Thus, the method 700 provides the mobile device 115-*a* the ability to concurrently access different WWAN technologies. It should be noted that the method 700 is just one implementation and that the operations of the method 700 may be rearranged or otherwise modified such that other implementations are possible.

Figure 8:
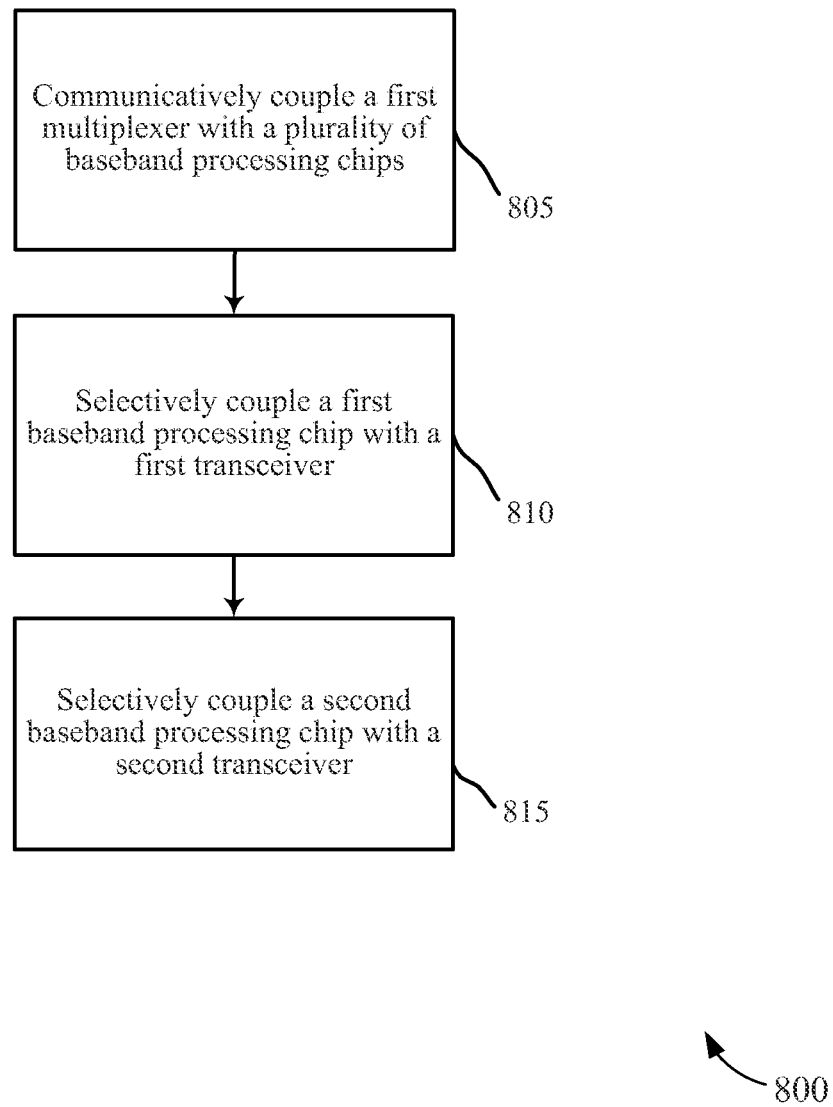
FIG. 8 is a flow chart of another example of a method to concurrently access different WWAN data technologies using the multi-chip processing platform.

FIG. 8 is a flow chart illustrating an example of a method 800 to concurrently communicate across different WWANs. For clarity, the method 800 is described below with reference to the mobile device 115-*a* shown in FIG. 2, which may be an example of the mobile device 115 of FIG. 1, 3, 4, 5, or 6. In one example, the method 800 may be implemented by a first multiplexer 215-*a*-1, which may be an example of the multiplexer 215 of FIG. 2. At block 805, the first multiplexer 215-*a*-1 may be communicatively coupled with a number of baseband processing chips 205-*a*-1. In one configuration, at block 810, a first baseband processing chip, such as baseband processing chip 1 205-*a*-1, may be selectively coupled with a first transceiver 220-*a*-1 to establish a first connection with a first WWAN. Further, a second baseband processing chip, such as baseband processing chip 2 205-*a*-2 may be selectively coupled with a second transceiver 220-*a*-2 to establish a second connection with a second WWAN. The second connection may be concurrently operable with the first connection. Thus, the method 800 may provide the mobile device 115-*a* with simultaneous access to different WWANs. It should be noted that the method 800 is just one implementation and that the operations of the method 800 may be arranged or otherwise modified such that other implementations are possible.

Figure 9:
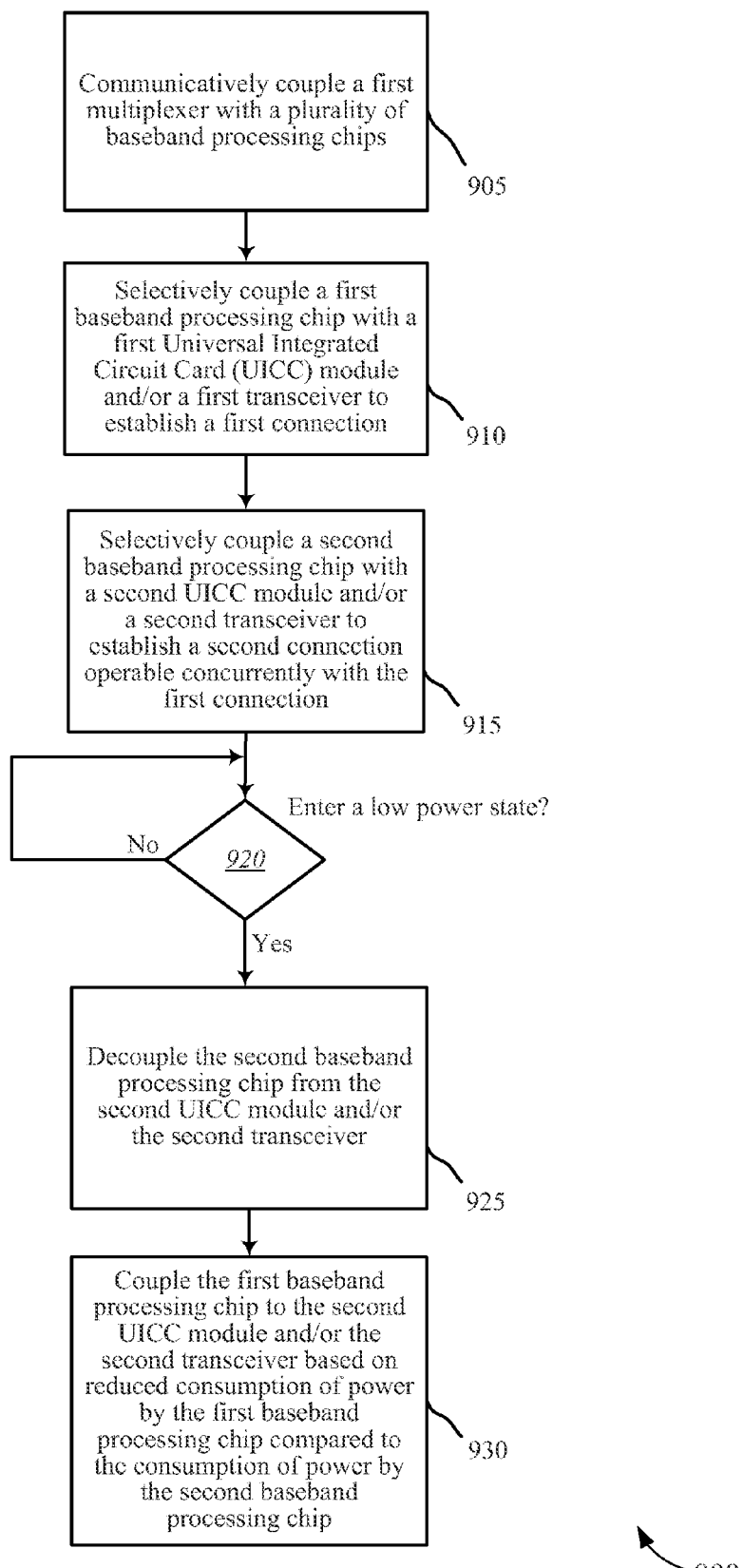
FIG. 9 is a flow chart of a method to establish a low power state of operation within the mobile device.

FIG. 9 is a flow chart illustrating an example of a method 900 to establish a low power state of operation within a mobile device 115-*a*. The method 900 is described below with reference to the mobile device 115-*a* shown in FIG. 2, which may be an example of the mobile device 115 of FIG. 1, 3, 4, 5, or 6. The method 900 may be implemented by a first multiplexer 215-*a*-1, which may be an example of the multiplexer 215 shown in FIG. 2. At block 905, the first multiplexer may be communicatively coupled with a number of baseband processing chips 205-*a*. For example, the first multiplexer 215-*a*-1 may be integrated within one of the baseband processing chips 205-*a*. As another example, the first multiplexer 215-*a*-1 may be in electronic communication with each of the baseband processing chips 205-*a*. At block 910, a first baseband processing chip, such as baseband processing chip 1 205-*a*-1, may be selectively coupled 910 with a first UICC module and/or a first transceiver, such as UICC module 1 210-*a*-1 and/or the first transceiver 220-*a*-1, via the first multiplexer 215-*a*-1 to establish a first connection. At block 915, a second baseband processing chip, such as baseband processing chip 205-*a*-2 may be selectively coupled with a second UICC module and/or a second transceiver, such as UICC module 2 210-*a*-2 and/or the second transceiver 220-*a*-2, via the first multiplexer 215-*a*-1 to establish a second connection. The first connection may provide access for the mobile device 115-*a* to a first WWAN (via the first transceiver) and a first WWAN data technology (via the first UICC module). The second connection may provide the mobile device 115-*a* with access to a second WWAN (via the second transceiver) and a second WWAN data technology (via the second UICC module). The second connection may be operable concurrently with the first connection. Thus, the first multiplexer 215-*a*-1 may allow the mobile device 115-*a* to concurrently access different WWANs and different data technologies provided by the different WWANs.

In one example, the second baseband processing chip may consume more power than the first baseband processing chip. For example, the second baseband processing chip may manage one or more applications executing on the mobile device 115-*a* that consume a higher rate of power than applications managed by the first baseband processing chip. As another example, the second baseband processing chip may consume more power because it may manage a display of the mobile device 115-*a*. At block 920, a determination may be made as to whether the mobile device 115-*a* is entering a low data rate and low power state. In a low data rate state, only a single baseband processing chip, UICC module, and transceiver may be active. In a low power state, the mobile device 115-*a* may desire to activate (or maintain in an active state) the baseband processing chip that consumes the least amount of power as compared with other processing chips. If it is determined that the device 115-*a* is not entering a low power state, the method 900 may return to continue determining whether the mobile device is entering a low power state. If, however, it is determined that the device 115-*a* is entering a low power state, the second baseband processing chip may be decoupled from the second UICC module and/or the second transceiver at block 925. At block 930, the first baseband processing chip may be communicatively coupled to the second UICC module and/or the second transceiver. For example, the first multiplexer 215-*a*-1 may decouple the connection between the second baseband processing chip, the second UICC module, and the second transceiver and communicatively couple the first baseband processing chip to the second UICC module and the second transceiver based on reduced consumption of power by the first baseband processing chip compared to the consumption of power by the second baseband processing chip. Thus, the method 900 may allow the mobile device 115-*a* to consume the low amount of power when the device 115-*a* enters a low power mode of operation. It should be noted that the method 900 is just one implementation and that the operations of the method 900 may be arranged or otherwise modified such that other implementations are possible.

Figure 10:
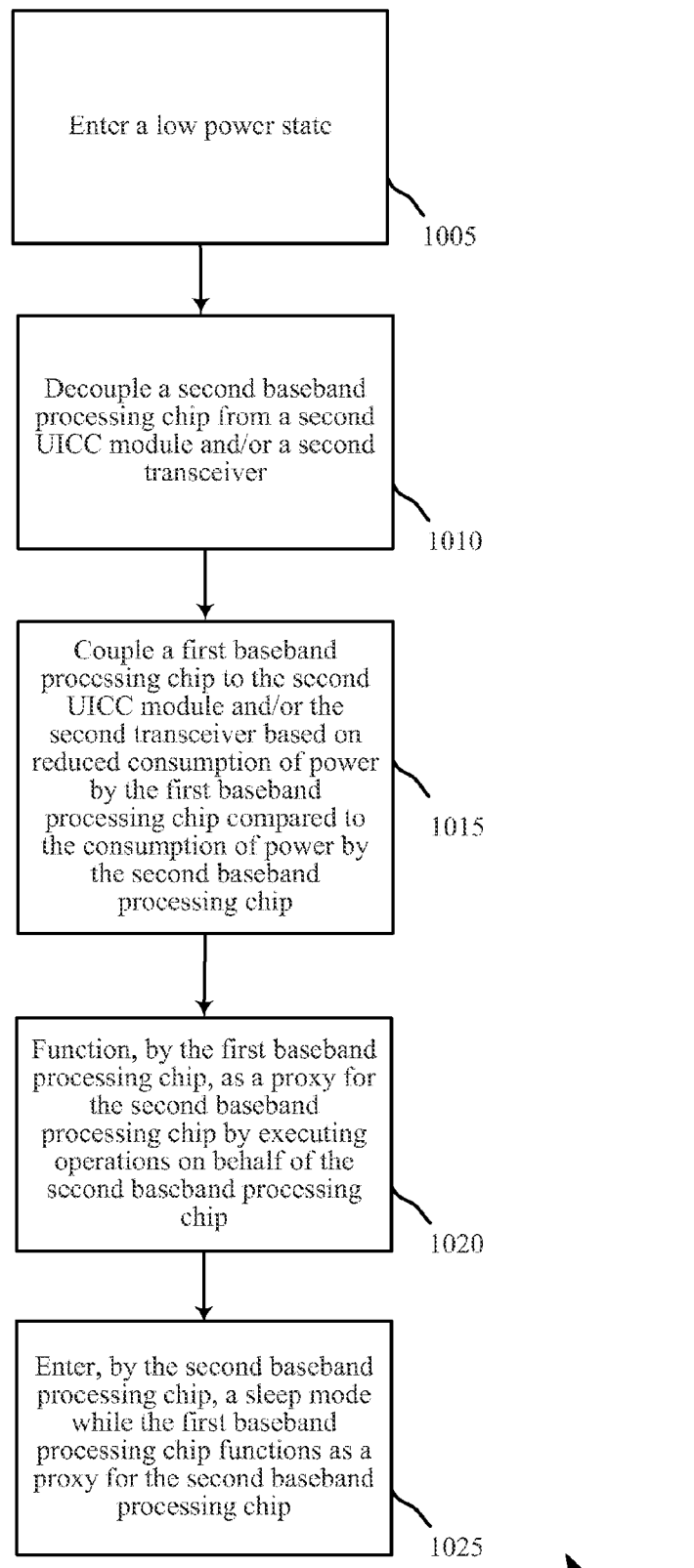
FIG. 10 is a flow chart of an example of a method to establish a proxy mode of operation within the mobile device.

FIG. 10 is a flow chart illustrating an example of a method 1000 to establish a proxy mode of operation within a mobile device 115-*a*. The method 1000 is described below with reference to the mobile device 115-*a* shown in FIG. 2, which may be an example of the mobile device 115 of FIG. 1, 3, 4, 5, or 6. The method 1000 may be implemented by a first multiplexer 215-*a*-1, which may be an example of the multiplexer 215 shown in FIG. 2. At block 1005, the mobile device 115-*a* may enter a low power state. In a low power state, it may be desirable for the mobile device 115-*a* to use a single baseband processing chip, UICC, and transceiver. In one configuration, the mobile device 115-*a* may be using multiple baseband processing chips, UICC modules, and transceivers when it enters the low power state. In another example, when the mobile device 115-*a* enters the low power state, it may be using a baseband processing chip that consumes a higher amount of power compared to other baseband processing chips. At block 1010, a second baseband processing chip, such as baseband processing chip 2 205-*a*-2, may be decoupled (via the first multiplexer 215-*a*-1) from a second UICC module and/or a second transceiver, such as UICC module 2 210-*a*-2 or the second transceiver 220-*a*-2. At block 1015, a first baseband processing chip, such as baseband processing chip 1 205-*a*-1, may be communicatively coupled to the second UICC module and/or the second transceiver via the first multiplexer 215-*a*-1. In one example, the second baseband processing chip may consume more power compared with the power consumption of the first baseband processing chip. As a result, the first baseband processing chip may be coupled to the second UICC module and/or the second transceiver based on reduced consumption of power by the first baseband processing chip compared to the consumption of power by the second baseband processing chip.

At block 1020, the first baseband processing chip may function as a proxy for the second baseband processing chip. For example, the first baseband processing chip may execute operations on behalf of the second baseband processing chip. In one example, the first baseband processing chip may execute email operations on behalf of the second baseband processing chip. In another example, the first baseband processing chip may proxy for the second baseband processing chip by executing instant messaging (IM) operations on behalf of the second baseband processing chip. At block 1025, the second baseband processing chip may enter a sleep mode while the first baseband processing chip functions as a proxy. Thus, the method 1000 may allow the mobile device 115-*a* to consume a low amount of power when the device 115-*a* enters a low power mode of operation by connecting the baseband processing chip that consumes the least amount of power to a UICC module and a transceiver. The connected baseband processing chip may serve as a proxy for the unconnected baseband processing chip. It should be noted that the method 1000 is just one implementation and that the operations of the method 1000 may be arranged or otherwise modified such that other implementations are possible.

Figure 11:
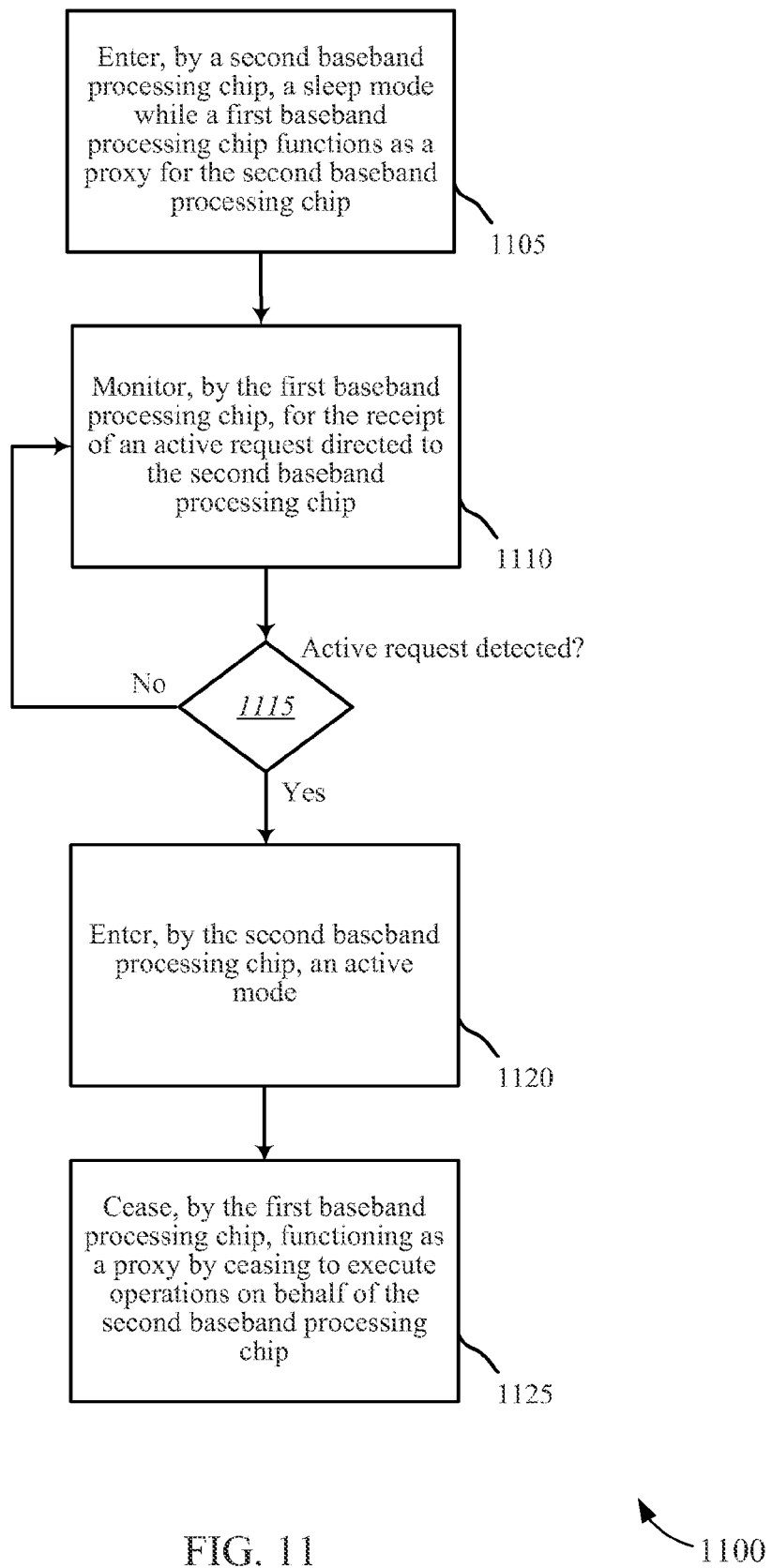
FIG. 11 is a flow chart of a method to discontinue a proxy mode of operation within the mobile device.

FIG. 11 is a flow chart illustrating one configuration of a method 1100 to discontinue a proxy mode of operation within a mobile device 115-*a*. The method 1100 is described below with reference to the mobile device 115-*a* shown in FIG. 2, which may be an example of the mobile device 115 of FIG. 1, 3, 4, 5, or 6. The method 1100 may be implemented by a first multiplexer 215-*a*-1, which may be an example of the multiplexer 215 shown in FIG. 2. At block 1105, a second baseband processing chip may enter a sleep mode while a first baseband processing chip functions as a proxy for the second baseband processing chip. For example, when the device 115-*a* enters a low power state, the first multiplexer 215-*a*-1 may decouple the first baseband processing chip from a UICC module and a transceiver. The first multiplexer 215-*a*-1 may connect the second baseband processing chip to the UICC module and the transceiver because the second baseband processing chip may consume less power as compared with the first baseband processing chip. At block 1110, the first baseband processing chip may monitor for the receipt of an active request directed to the second baseband processing chip. For example, a request may be received relating to an operation normally executed by the second baseband processing chip. Examples of these types of active requests include messages relating to incoming email messages, IMs, etc. At block 1115, a determination may be made as to whether an active request has been detected. If it is determined that an active request has not been detected, the method 1100 may return to continue monitoring for the receipt of an active request directed to the second baseband processing chip. If, however, it is determined that an active request has been detected, at block 1120, the second baseband processing chip may enter an active mode (i.e., exit the sleep mode). For example, the second baseband processing chip may enter the active mode to execute the active request. At block 1125, the first baseband processing chip may cease to function as a proxy for the second baseband processing chip. In other words, the first baseband processing chip may cease the execution of operations on behalf of the second baseband processing chip. In one example, the first baseband processing chip may not have the capacity or functionality to execute the active request on behalf of the second baseband processing chip. Thus, the method 1100 may allow the mobile device 115-*a* to discontinue the proxy mode of operation by disconnecting the baseband processing chip that serves as a proxy and connecting the processing chip that is capable of executing the active request. It should be noted that the method 1100 is just one implementation and that the operations of the method 1100 may be arranged or otherwise modified such that other implementations are possible.

Figure 12:
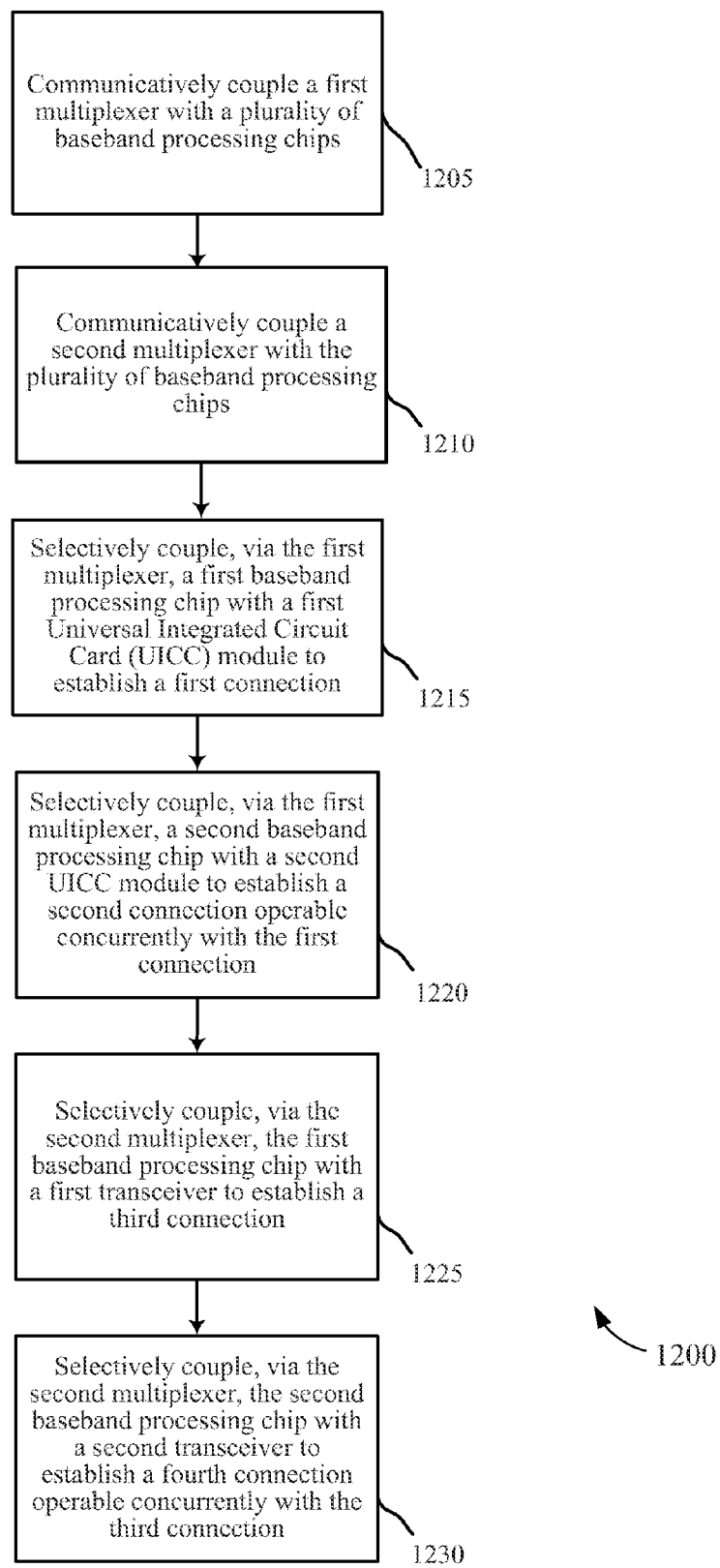
FIG. 12 is a flow chart of a method to reconfigure the multi-chip WWAN processing platform included in the mobile device.

FIG. 12 is a flow chart illustrating one example of a method 1200 to reconfigure a multi-chip WWAN processing platform included in a mobile device 115-*a*. The method 1200 is described below with reference to the mobile device 115-*a* shown in FIG. 2, which may be an example of the mobile device 115 of FIG. 1, 3, 4, 5, or 6. The method 1200 may be implemented by a first multiplexer 215-*a*-1 and a second multiplexer 215-*a*-2, which may be an example of the multiplexer 215 shown in FIG. 2. At block 1205, the first multiplexer 215-*a*-1 may be communicatively coupled with a number of baseband processing chips 205-*a*. At block 1210, the second multiplexer 215-*a*-2 may also be communicatively coupled with the number of baseband processing chips 205-*a*. At block 1215, a first baseband processing chip may be selectively coupled, via the first multiplexer 215-*a*-1, with a first UICC module to establish a first connection. The first connection may provide the mobile device 115-*a* with access to a first WWAN data technology. At block 1220, a second baseband processing chip may be selectively coupled, via the first multiplexer 215-*a*-1, with a second UICC module to establish a second connection. The second connection may allow the mobile device 115-*a* to access a second WWAN data technology. In one example, the second connection may be operable concurrently with the first connection.

At block 1225, the first baseband processing chip may be selectively coupled, via the second multiplexer 215-*a*-2, with a first transceiver to establish a third connection. The third connection may be a connection with a first WWAN that provides the first WWAN data technology. Further, at block 1230, the second baseband processing chip may be selectively coupled, via the second multiplexer 215-*a*-2, with a second transceiver to establish a fourth connection. The fourth connection may represent an established communications connection with a second WWAN that provides the device access to the second WWAN data technology. In one example, the fourth connection may be operable concurrently with the third connection. Thus, the method 1200 may allow the mobile device 115-*a* to establish connections between various baseband processing chips and other components, such as UICC modules and transceivers. These connections may be reconfigurable and dynamic so that each baseband processor may be connected to any UICC module, transceiver, or combination thereof via the multiplexers 215-*a*. The mobile device 115-*a* may include any number of multiplexers to increase the possible combinations of connections between the baseband processing chips and the other components within the mobile device 115-*a*. It should be noted that the method 1200 is just one implementation and that the operations of the method 1200 may be arranged or otherwise modified such that other implementations are possible.

Figure 13:
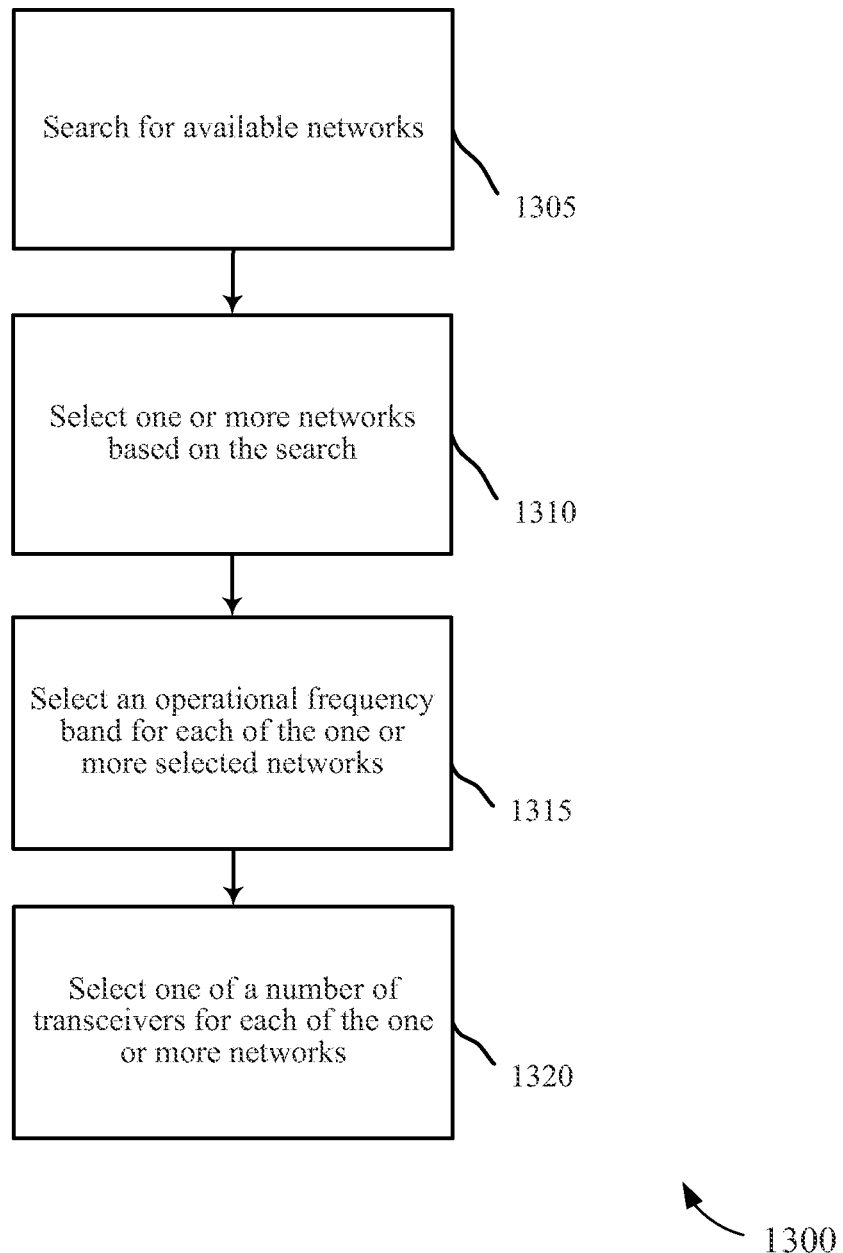
FIG. 13 is a flow chart illustrating one example of a method 1300 to select a specific transceiver to communicate across a selected network.

FIG. 13 is a flow chart illustrating one example of a method 1300 to select a specific transceiver to communicate across a selected network. The method 1300 is described below with reference to the mobile device 115-*a* shown in FIG. 2, which may be an example of the mobile device 115 of FIG. 1, 3, 4, 5, or 6. The method 1300 may be implemented by a multiplexer controller 325, which may be an example of the multiplexer controller shown in FIG. 3, 3A, 3, 5, or 6. At block 1305, a search for available networks may be performed. The search may be performed while the mobile device 115-*a* is currently communicating across a network or the search may be performed before the mobile device 115-*a* has established communications with a network. At block 1310, one or more networks may be selected that were identified in the search. The one or more networks may be selected based on the technologies provided by the networks. The one or more networks may also be selected based on the frequency band associated with each network. For example, at block 1315, an operational frequency band for each of the one or more selected networks may be selected. At block 1320, one or a number of transceivers may be selected for each of the one or more networks. The selection of a transceiver for a particular network may be based on the capabilities and design of the transceiver. For example, a first transceiver may be better suited to communicate across a selected network that operates in a certain frequency band and/or provides a certain technology than a second transceiver. As a result, the multiplexer controller 325 may select the first transceiver to communicate across the selected network. Thus, the method 1300 may allow the mobile device 115-*a* to search for available networks and select an appropriate transceiver to communicate with each selected network.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A communications device comprising:
a plurality of baseband processing chips;
a plurality of Universal Integrated Circuit Card (UICC) chips; and
a first multiplexer, communicatively coupled with the plurality of baseband processing chips and configured to:
selectively couple a first baseband processing chip with a first UICC module to establish a first connection;
selectively couple a second baseband processing chip with a second UICC module to establish a second connection operable concurrently with the first connection; and
decouple the second baseband processing chip from the second UICC module and couple the first baseband processing chip to the second UICC module based on reduced consumption of power by the first baseband processing chip compared to a consumption of power by the second baseband processing chip.

2. The communications device of claim 1, further comprising:
a plurality of transceivers;
wherein the first multiplexer is further configured to:
selectively couple the first baseband processing chip with a first transceiver; and
selectively couple the second baseband processing chip with a second transceiver.

3. The communications device of claim 1, wherein the first baseband processing chip is configured to function as a proxy for the second baseband processing chip by executing operations on behalf of the second baseband processing chip.

4. The communications device of claim 1, wherein the second baseband processing chip is configured to enter a sleep mode while the first baseband processing chip functions as a proxy for the second baseband processing chip.

5. The communications device of claim 1, wherein the first baseband processing chip is configured to execute email operations on behalf of the second baseband processing chip.

6. The communications device of claim 1, wherein the first baseband processing chip is configured to execute instant messaging (IM) operations on behalf of the second baseband processing chip.

7. The communications device of claim 1, wherein the first baseband processing chip is configured to monitor for a receipt of an active request directed to the second baseband processing chip.

8. The communications device of claim 1, wherein upon receipt of an active request, the second baseband processing chip is configured to enter an active mode; and
the first baseband processing chip is configured to cease to function as a proxy by ceasing to execute operations on behalf of the second baseband processing chip.

9. The communications device of claim 1, wherein the first multiplexer is integrated into one of the plurality of baseband processing chips.

10. The communications device of claim 1, wherein at least one of the plurality of baseband processing chips is configured to manage one or more applications executing on the communications device.

11. The communications device of claim 1, wherein at least one of the plurality of baseband processing chips is configured to manage a display of the communications device.

12. The communications device of claim 1, further comprising a second multiplexer, communicatively coupled with the plurality of baseband processing chips and configured to:
selectively couple the first baseband processing chip with a first transceiver to establish a third connection; and
selectively couple the second baseband processing chip with a second transceiver to establish a fourth connection operable concurrently with the third connection.

13. The communications device of claim 1, further comprising a multiplexer controller configured to:
search for available networks;
select one or more of the available networks based on the search;
select an operational frequency band for each of the one or more selected networks; and
select one of the plurality of transceivers for each of the one or more selected networks.

14. The communications device of claim 2, wherein the first connection comprises the first baseband processing chip coupled with the first transceiver.

15. The communications device of claim 2, wherein the second connection comprises the second baseband processing chip coupled with the second transceiver.

16. A method for establishing a reconfigurable multi-chip wireless wide area network (WWAN) processing platform, the method comprising:
communicatively coupling a first multiplexer with a plurality of baseband processing chips;
selectively coupling a first baseband processing chip with a first Universal Integrated Circuit Card (UICC) module to establish a first connection;
selectively coupling a second baseband processing chip with a second UICC module to establish a second connection operable concurrently with the first connection; and
decoupling the second baseband processing chip from the second UICC module and coupling the first baseband processing chip to the second UICC module based on reduced consumption of power by the first baseband processing chip compared to the consumption of power by the second baseband processing chip.

17. The method of claim 16, further comprising:
selectively coupling the first baseband processing chip with a first transceiver; and
selectively coupling the second baseband processing chip with a second transceiver.

18. The method of claim 16, further comprising functioning, by the first baseband processing chip, as a proxy for the second baseband processing chip by executing operations on behalf of the second baseband processing chip.

19. The method of claim 16, further comprising entering, by the second baseband processing chip, a sleep mode while the first baseband processing chip functions as a proxy for the second baseband processing chip.

20. The method of claim 16, further comprising executing, by the first baseband processing chip, email operations on behalf of the second baseband processing chip.

21. The method claim 16, further comprising executing, by the first baseband processing chip, instant messaging (IM) operations on behalf of the second baseband processing chip.

22. The method of claim 16, further comprising monitoring, by the first baseband processing chip, for a receipt of an active request directed to the second baseband processing chip.

23. The method of claim 16, wherein upon receipt of an active request, further comprising:
entering, by the second baseband processing chip, an active mode; and
ceasing, by the first baseband processing chip, to function as a proxy by ceasing to execute operations on behalf of the second baseband processing chip.

24. The method of claim 16, wherein the first multiplexer is integrated into one of the plurality of baseband processing chips.

25. The method of claim 16, further comprising managing, by at least one baseband processing chip, one or more applications executing on the communications device.

26. The method of claim 16, further comprising managing, by at least one baseband processing chip, a display of the communications device.

27. The method of claim 16, further comprising:
communicatively coupling a second multiplexer with the plurality of baseband processing chips;
selectively coupling the first baseband processing chip with a first transceiver to establish a third connection; and
selectively coupling the second baseband processing chip with a second transceiver to establish a fourth connection operable concurrently with the third connection.

28. The method of claim 16, further comprising:
searching for available networks;
selecting one or more of the available networks based on the search;
selecting an operational frequency band for each of the one or more selected networks; and
selecting one of the plurality of transceivers for each of the one or more selected networks.

29. The method of claim 17, wherein the first connection comprises the first baseband processing chip coupled with the first transceiver.

30. The method of claim 17, wherein the second connection comprises the second baseband processing chip coupled with the second transceiver.

31. A system for establishing a reconfigurable multi-chip wireless wide area network (WWAN) processing platform, the system comprising:
means for communicatively coupling a first multiplexer with a plurality of baseband processing chips;
means for selectively coupling a first baseband processing chip with a first Universal Integrated Circuit Card (UICC) module to establish a first connection;

means for selectively coupling a second baseband processing chip with a second UICC module to establish a second connection operable concurrently with the first connection;

means for decoupling the second baseband processing chip from the second UICC module; and means for coupling the first baseband processing chip to the second UICC module based on reduced consumption of power by the first baseband processing chip compared to a consumption of power by the second baseband processing chip.

32. The system of claim 31, further comprising:

means for selectively coupling the first baseband processing chip with a first transceiver; and means for selectively coupling the second baseband processing chip with a second transceiver.

33. The system of claim 31, wherein the first connection comprises the first baseband processing chip coupled with the first transceiver.

34. The system of claim 31, wherein the second connection comprises the second baseband processing chip coupled with the second transceiver.

35. A computer program product for establishing a reconfigurable multi-chip wireless wide area network (WWAN) processing platform, the computer program product comprising:

a non-transitory computer-readable medium comprising:

code for communicatively coupling a first multiplexer with a plurality of baseband processing chips;

code for selectively coupling a first baseband processing chip with a first Universal Integrated Circuit Card (UICC) module to establish a first connection;

code for selectively coupling a second baseband processing chip with a second UICC module to establish a second connection operable concurrently with the first connection;

code for decoupling the second baseband processing chip from the second UICC module; and code for coupling the first baseband processing chip to the second UICC module based on reduced consumption of power by the first baseband processing chip compared to a consumption of power by the second baseband processing chip.

36. The computer program product of claim 35, further comprising:

code for selectively coupling the first baseband processing chip with a first transceiver; and code for selectively coupling the second baseband processing chip with a second transceiver.

37. The computer program product of claim 35, wherein the first connection comprises first baseband processing chip coupled with the first transceiver.

38. The computer program product of claim 35, wherein the second connection comprises the second baseband processing chip coupled with the second transceiver.

* * * * *